May 1, 1945.  V. W. FARRIS  2,374,672
POWER TRANSMISSION MEANS
Filed April 13, 1942    2 Sheets-Sheet 1
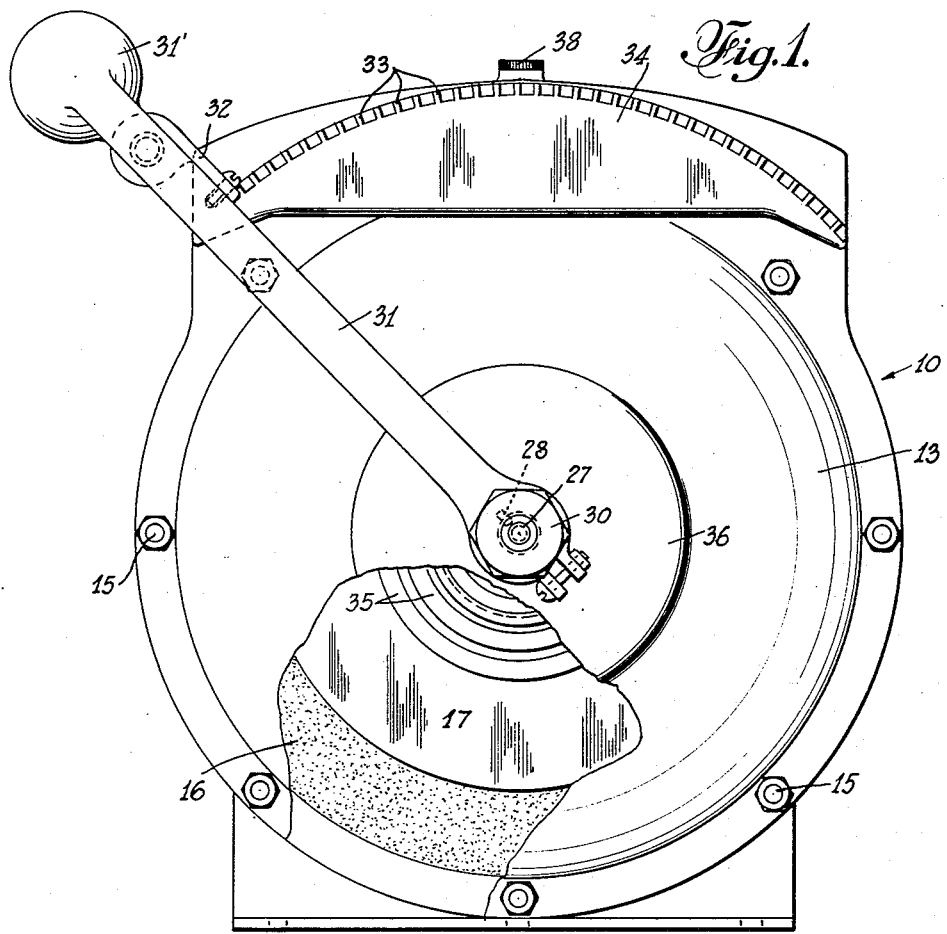
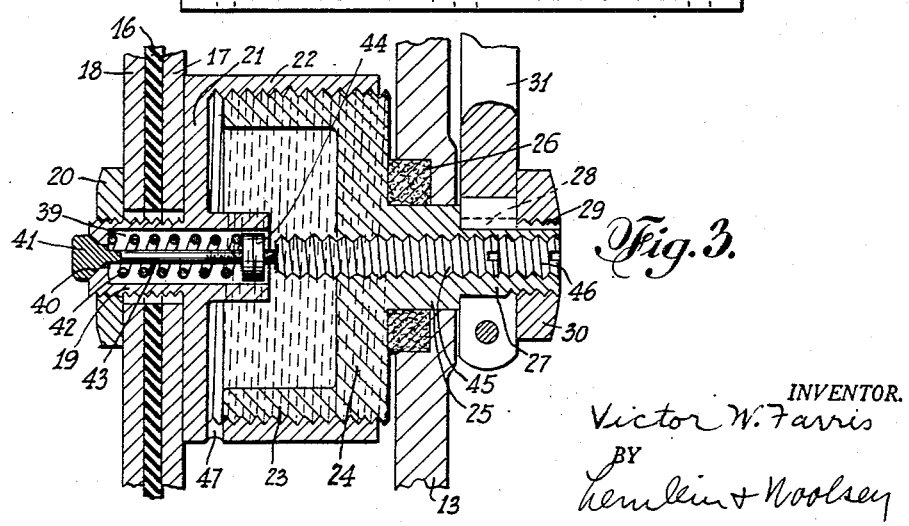
INVENTOR.
Victor W. Farris
BY
Lemlein & Woolsey May 1, 1945.　　　V. W. FARRIS　　　2,374,672
POWER TRANSMISSION MEANS
Filed April 13, 1942　　　2 Sheets-Sheet 2
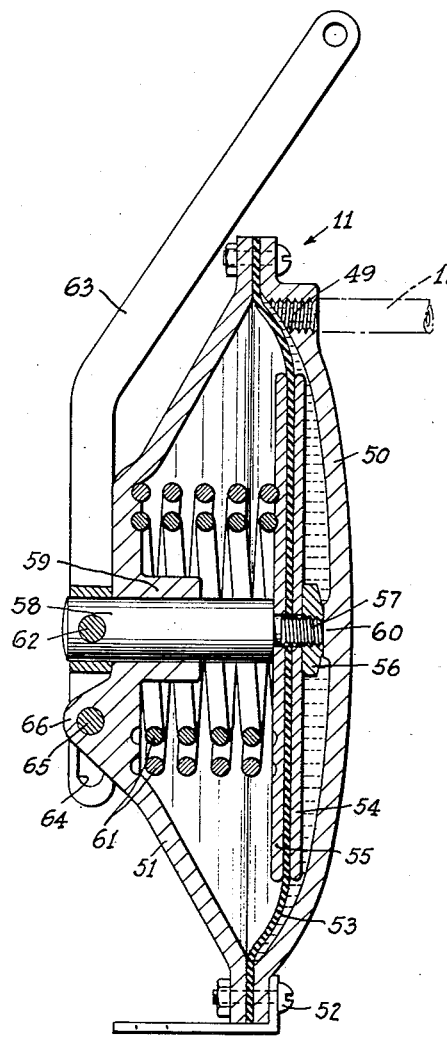
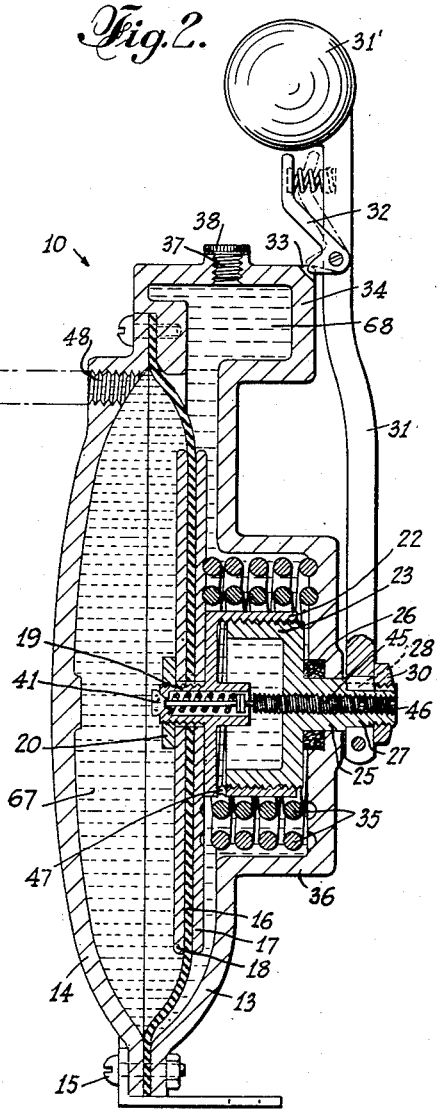
INVENTOR.
Victor W. Farris
BY
Lemlein & Woolsey Patented May 1, 1945

2,374,672

UNITED STATES PATENT OFFICE 2,374,672

POWER TRANSMISSION MEANS

Victor W. Farris, New York, N. Y.

Application April 13, 1942, Serial No. 438,768

2 Claims. (Cl. 60—54.6)

My present invention relates to power transmission means and more particularly to a system of the general character described in which use is made of a fluid in the manner of a solid for conveying motion from a transmitting apparatus or actuator to a receiving device located at a remote point.

The present invention aims to provide a mechanism or system having the characteristics above referred to which is simple in construction, easy and economical to fabricate and assemble and admirably adapted to perform the intended functions as hereinafter more fully set forth.

In the accompanying specification I shall describe and in the annexed drawings show an illustrative embodiment of the system of power transmission of the present invention. It is, however, to be clearly understood that I do not wish to be limited to the exact details of construction herein shown and described for purposes of illustration only. It will be obvious that changes therein may be made without the exercise of invention and within the scope of the claims hereto appended.

In the accompanying drawings,

Figure 1 is a front elevational view of a transmitter or actuator constituting the main unit of the system of power transmission of the present invention, the same being partially broken away to show the inner construction;

Figure 2 is a transverse sectional view of the same taken substantially through the vertical center of Figure 1 and showing the relationship of the parts thereof in an inoperative or closed position;

Figure 3 is an enlarged sectional view of a fluid volume compensating means constituting a part of the present invention; and Figure 4 is a view similar to Figure 2 but showing one type of receiver which may constitute a part of the system of power transmission of the present invention.

Referring now more in detail to the aforesaid illustrative embodiment of the system of power transmission of the present invention, and with particular reference to the drawings illustrating the same, the numeral 10 generally designates an actuator and the numeral 11 generally designates a receiver, these two units being connected by tubing 12.

In detail, the actuator 10, which is the main component of the present invention, comprises a substantially circular and dish-shaped front plate 13 and a co-operating, substantially circular and dish-shaped rear plate 14, the two plates being held together by a plurality of peripherally disposed bolts 15.

Supported intermediate the peripheral portions of the plates 13 and 14, by means of the bolts 15, is a substantially circular, flexible diaphragm 16 having disposed on each side thereof circular, rigid discs 17 and 18, the diameters of these discs being alike but being less than the diameter of the diaphragm 16. The plates 17 and 18 are provided with central apertures in register with a central aperture in the diaphragm 16 and the three elements are disposed over an externally threaded hub 19 and maintained thereon, intermediate a nut 20, engageable with the threads of the hub, and the bottom wall 21 of an internally threaded cup 22, the wall 21 and cup 22 being integrally formed with the hub 19 and the internal threads of the cup being left handed.

Engageable with the left-handed threads of the cup 22 is an externally threaded cup 23 integrally formed with a bottom wall 24, in turn, integrally formed with a hub 25 journalled in the front plate 13. The journal is provided with a packing 26 to prevent leakage, as will hereinafter be more fully understood, from the hereinafter described reservoir-side of the transmitter 10.

Integrally formed with the hub 25 and extending beyond the front plate 13 is a reduced portion 27 provided with a key 28 immediately adjacent the hub 25 and threads 29 at the outer extremity thereof. By means of a nut 30, engageable with the threads 29, and the key 28, the reduced portion 27 of the hub 25 supports a lever 31. The lever extends upwardly and is provided, adjacent the gripping portion 31' at the outer end thereof, with a spring-pressed, manually operated catch member 32 which is engageable with arcuately disposed serrations 33 formed on an extension 34 of the front plate 13, which extension constitutes a fluid reservoir. By this arrangement, the lever 31 can be moved to any desired position and maintained there by means of the engagement between the catch member 32 and the serrations 33.

In order to counterbalance any back pressure exerted by the receiver 11, as hereinafter more fully set forth, I provide a pair of co-operable coil-springs 35 which bear against the disc 17 at one end thereof and at the other end, against the inner surface of a recessed portion 36, formed in the front plate 13 to house the springs 35 and also the co-operating cups 22 and 23.

The reservoir portion 34 of the front plate 13 is provided with a port 37 having a vented cap 38 communicating with the atmosphere and it is to be noted that the level of any fluid in the reservoir is above the highest level of any fluid maintained in the space intermediate the rear plate 14 of the transmitter and the side of the diaphragm 16 provided with the disc 18. In order to obtain communication between the reservoir side of the diaphragm 16 and the pressure-exerting side thereof, I provide the hub 19 with a port 39, the high pressure side of which communicates with a seat 40 having co-operable therewith a valve 41. In order to maintain the valve 41 in a normally closed position against the seat 40, I provide, within the port 39, a spring 42 coiled about the stem 43 of the valve, the spring abutting, at one end, a bearing surface formed with the hub 19 and, at the other end, washers 44 threadedly engaged on the stem 43. The position of the valve 41 is controlled by an adjusting screw 45 threadedly engaged in the hub 25 and this screw may be locked in any adjusted position by means of the threaded locking plug 46 engageable in the internally threaded, reduced portion 27 of the hub 25. The transmitter or actuator 10 is completed by the provision of a port 47 in the cup 22 permitting communication between the reservoir 34 and the inner region of the co-operating cups 22 and 23, and in turn with the port 39; and a port 48 which permits communication between the high pressure side of the diaphragm 16 and the tubing 12.

In detail, the receiver 11 includes a port 49 communicating with the tubing 12, the port being formed in a substantially circular and dish-shaped front plate 50 which is secured to a substantially circular, dish-shaped rear plate 51 by means of a multiplicity of peripherally disposed bolts 52. Secured intermediate the plates 50 and 51 by means of the bolts 52 is a circular, flexible diaphragm 53 having disposed at both sides thereof rigid discs 54 and 55. The diaphragm 53 and the plates 54 and 55 are similar to the diaphragm 16 and the plates 17 and 18 constituting a part of the transmitter 10. By means of a nut 56 the diaphragm 53 and the associated plates 54 and 55 are mounted on the reduced threaded portion 57 of a rod 58 slidably mounted in an inwardly directed boss 59 formed with the rear plate 51. The inward movement of this slidable rod 58 is limited by contact with a stop projection 60 formed on the inner surface of the front plate 50, the rod 58 being normally urged toward this position as shown in Figure 4 of the drawings under the pressure of a pair of cooperating springs 61 which bear, at one end, against the inner wall of the rear plate 51 and, at the other end, against the disc 55. The expansive pressure of the springs 61 should be equal to that of the springs 35 so that the manual pressure necessarily exerted in the operation of the system need be sufficient merely to move the fluid from the transmitter to the receiver and permit the springs 61 to move the fluid back to its normal position by removing the counterbalancing pressure of the springs 35.

Pivotally mounted, as at 62, on the outer end of the rod 58, is a lever 63, the lower end of which is provided with a slot 64 engageable with a pivot-pin 65 carried intermediate a pair of ears 66 formed on the rear plate 51, the upper end of the lever 63 being secured, by appropriate means, to any mechanism which it is desired to control, such as the throttle controlling carburetion to an internal combustion motor, a ship telegraph, switching operations etc.

The space intermediate the front plate 50 and the diaphragm 53, and the space intermediate the front plate 14 and the diaphragm 16, and the tubing 12 connecting the transmitter 10 and receiver 11 is completely filled with a fluid 67, such as oil. The space intermediate the front plate 13 of the transmitter 10 and the diaphragm 16, including the reservoir 34, is likewise filled with a fluid 68, such as oil, and it will be noted that the fluid on the reservoir-side of the diaphragm 16 is at a higher level than it is on the opposite side of the same diaphragm.

This completes the description of the aforesaid illustrative embodiment of the present invention and its mode of operation and use may be briefly summarized as follows:

With all of the parts of the entire system in the position shown in the drawings, it will be observed that the lever 31 is in what may be called its closed position, with the result that the reduced portion 57 of the slidable rod 58 abuts the projection 60 on the plate 50 and the lever 63 is therefore in what may be called its closed position. By releasing the catch 32 from the serrations 33, the lever 31 may be pivoted to the right in Figure 1 and maintained at any desired position by releasing the catch 32 so as to engage the serration immediately adjacent thereto. Actually, the catch 32 is not necessary because the lever 31 will stay at any position to which it is moved in view of the counterbalancing actions of the springs 35 and 61, but in order to guard against vibration, it is better to provide this element. This movement of the lever 31 is transmitted to the inner cup 23 which, because of the left-handed threads with which said cup is provided, moves the cup 22 outwardly or away from the cup 23. A corresponding movement is therefore imparted to the diaphragm 16 and through the medium of the solid head of fluid, a corresponding movement is imparted to the diaphragm 53. This, in turn, acting against the springs 61, but being aided by the springs 35, slides the rod 58 outwardly, imparting a pivotal motion to the lever 63 and, depending upon the angle of the cut of the threads in the cups 22 and 23, the lever 63 will be moved through an angle equal to, greater, or less than the angle through which the actuating lever 31 was moved. Thus, the equipment which is coupled to the upper end of the lever 63 may be controlled in a pre-determined fashion. By now moving the lever 31 back toward its starting position, the cup 22 is drawn into closer relationship with the cup 23, removing the pressure of the head of the fluid and permitting the springs 61 to urge the diaphragm 53 in a manner to follow the release of the head of the fluid.

Obviously, in order to have the lever 63 faithfully follow the manually-controlled movement of the lever 31 it is necessary that the volume of oil or other fluid within the closed portion of the system remain at a constant. An operator of the system described herein would immediately become aware of a change in this volume upon noting either that the lever 63 was not at its "zero" position when the lever 31 was at its "zero" position or that the lever 31 had to be moved a certain distance toward its open position before the lever 63 started to move toward its corresponding position. The first observation would indicate that the fluid within the closed portion of the system had expanded in volume and the second observation would indicate either that the fluid had contracted or that some of it had been lost through leakage. In any event, he could proceed to correct these conditions in the following manner. By moving the lever 31 slightly to the left of the starting position shown in Figure 1 of the drawings, the cups 22 and 23 become more closely coupled. This results in the free end of the stem 43 of the valve 41 coming into contact with the inner end of the adjusting screw 45 and slight movement beyond this point results in opening the valve 41 to permit a flow of fluid either from the reservoir side of the diaphragm 16 through the port 47 of the cup 22 and through the port 39 in the hub 19, to mingle with the fluid on the opposite side of the diaphragm or vice versa. It will be remembered that the fluid on the reservoir side is under atmospheric pressure and inasmuch as the level of the fluid on this side is higher than that on the so-called "pressure" side, this flow will continue one way or the other until the closed portion of the system is completely filled or balanced for excess. By then returning the lever 31 to its normal position shown in Figure 1 the system is ready for accurate operation again.

This completes the description of the mode of operation and use of the power transmission system of the present invention, and it will be noted from all of the foregoing that I have provided a system which is simple in construction, easy and economical to fabricate and assemble and admirably adapted to perform its intended functions. Other objects and advantages of the present invention will be obvious to those skilled in the art to which the present invention relates.

What I claim as my invention is:

1. In a power transmission system, an actuator including a housing, a diaphragm mounted for reciprocation in said housing and dividing the same into a reservoir filled with a pressure-transmitting fluid and a hydraulic pressure chamber communicating with a pressure-receiving member, said chamber also being filled with said pressure-transmitting fluid, compression means mounted in the reservoir of said housing and exerting a pressure against said diaphragm equal to the pressure exerted against the same from said hydraulic pressure chamber, means carried by said diaphragm for connecting said reservoir with said chamber to equalize the hydraulic pressure therein, and a pair of interengaged threaded members one of which is adapted to receive rotary motion and convey the same to the other through said threads, and the other of which is adapted to translate said rotary to reciprocating motion and convey the same to said diaphragm.

2. In a power transmission system, an actuator including a housing, a diaphragm mounted for reciprocation in said housing and dividing the same into a reservoir filled with a pressure transmitting fluid and a hydraulic pressure chamber communicating with a pressure-receiving member, said chamber also being filled with said pressure-transmitting fluid, compression means mounted in the reservoir of said housing and exerting a pressure against said diaphragm equal to the pressure exerted against the same from said hydraulic pressure chamber, means carried by said diaphragm for connecting said reservoir with said chamber to equalize the hydraulic pressure therein, and a pair of interengaged cup-like threaded members one of which is secured against rotation to said diaphragm and the other of which is rotatably mounted in said housing, the latter member being adapted to receive rotary motion and convey the same through said threads to the former, and the former being adapted to translate said rotary to reciprocating motion and convey the same to said diaphragm.

VICTOR W. FARRIS.